United States Patent
Kjems et al.

(10) Patent No.: US 10,412,488 B2
(45) Date of Patent: Sep. 10, 2019

(54) MICROPHONE ARRAY SIGNAL PROCESSING SYSTEM

(71) Applicant: Retune DSP ApS, Kgs. Lyngby (DK)

(72) Inventors: Ulrik Kjems, Frederiksberg (DK); Thomas Krogh Andersen, Tisvildeleje (DK)

(73) Assignee: Retune DSP ApS, Kgs. Lyngby (DK)

( * ) Notice: Subject to any disclaimer, the term of this patent is extended or adjusted under 35 U.S.C. 154(b) by 0 days.

(21) Appl. No.: 15/753,139

(22) PCT Filed: Jul. 18, 2016

(86) PCT No.: PCT/EP2016/067078
§ 371 (c)(1),
(2) Date: Feb. 15, 2018

(87) PCT Pub. No.: WO2017/029044
PCT Pub. Date: Feb. 23, 2017

(65) Prior Publication Data
US 2018/0249246 A1 Aug. 30, 2018

(30) Foreign Application Priority Data
Aug. 19, 2015 (EP) .................................. 15181534

(51) Int. Cl.
*G10L 15/20* (2006.01)
*H04R 3/00* (2006.01)
(Continued)

(52) U.S. Cl.
CPC .............. *H04R 3/005* (2013.01); *G10L 15/20* (2013.01); *G10L 21/0216* (2013.01);
(Continued)

(58) Field of Classification Search
CPC . H04R 3/00; H04R 3/005; G10L 2021/02166; G10L 15/20; G10L 21/02116
(Continued)

(56) References Cited

U.S. PATENT DOCUMENTS 9,264,807 B2 * 2/2016 Tashev .................. H04M 9/082
10,013,981 B2 * 7/2018 Ramprashad ........... G10L 15/20
(Continued)

OTHER PUBLICATIONS

R. Martin, Noice power spectral density estimation based on optimal smoothing and minimum statistics, IEEE Trans. Speech Audio Processing, vol. 9, No. 5, pp. 504-512, Jul. 2001.

*Primary Examiner* — Disler Paul
(74) *Attorney, Agent, or Firm* — Crawford Maunu PLLC (57) ABSTRACT

The present invention relates in one aspect to a microphone array signal processing system comprising a digital buffer coupled to a signal input and configured to store first and second digital audio signals. A beamformer analyzer is configured to, in response to a first voice trigger, determine noise statistics based on the first signal segment of the first digital audio signal and a first signal segment of the second digital audio signal. A coefficients calculator is configured to calculate a first set of fixed beamformer coefficients of a beamforming algorithm. The beamforming algorithm is configured for applying the first set of fixed beamformer coefficients to the first signal segments of the first and second digital audio signals retrieved from the digital buffer to produce a noise reduced digital audio signal.

19 Claims, 5 Drawing Sheets

(51) Int. Cl.
    *G10L 21/0216*     (2013.01)
    *G10L 25/84*     (2013.01)
    *G10L 21/0232*     (2013.01)
    *G10L 15/08*     (2006.01)

(52) U.S. Cl.
    CPC .......... *G10L 21/0232* (2013.01); *G10L 25/84* (2013.01); *G10L 2015/088* (2013.01); *G10L 2021/02166* (2013.01); *H04R 2499/11* (2013.01)

(58) Field of Classification Search
    USPC .................................... 381/92.11, 94.1–94.3
    See application file for complete search history.

(56) References Cited

U.S. PATENT DOCUMENTS

| | | | |
|---|---|---|---|
| 2012/0183149 A1* | 7/2012 | Hiroe .................... | G01S 3/8083 381/56 |
| 2012/0197638 A1 | 8/2012 | Li et al. | |
| 2013/0129101 A1* | 5/2013 | Tashev ................. | H04M 9/082 381/66 |
| 2014/0056435 A1 | 2/2014 | Kjems et al. | |
| 2014/0278394 A1* | 9/2014 | Bastyr ................. | G10L 21/0208 704/233 |
| 2015/0055799 A1 | 2/2015 | Nandy et al. | |
| 2015/0163602 A1 | 6/2015 | Pedersen et al. | |

\* cited by examiner

MICROPHONE ARRAY SIGNAL PROCESSING SYSTEM

FIELD OF THE INVENTION

The present invention relates in one aspect to a microphone array signal processing system comprising a digital buffer coupled to a signal input and configured to store first and second digital audio signals. A beamformer analyser is configured to, in response to a first voice trigger, determine noise statistics based on the first signal segment of the first digital audio signal and a first signal segment of the second digital audio signal. A coefficients calculator is configured to calculate a first set of fixed beamformer coefficients of a beamforming algorithm. The beamforming algorithm is configured for applying the first set of fixed beamformer coefficients to the first signal segments of the first and second digital audio signals retrieved from the digital buffer to produce a noise reduced digital audio signal.

BACKGROUND OF THE INVENTION

Research in signal processing systems, methods and algorithms for suppressing or removing noise components of a noise infected target signal, such as a voice or speech signal, has been on-going for decades. Important objectives of these efforts have been, and still are, to provide an improvement in the perceived sound quality and/or speech intelligibility for the listener. In voice communication apparatuses and systems it is known to represent a noisy speech signal in a time-frequency domain, e.g. as multiple sub-band signals. In many cases it is desirable to apply a frequency dependent complex valued beamforming coefficients, performing a linear combination in the complex domain of the sub-band signals derived from first and second digital audio signals, before a noise reduced output signal is reconstructed as a real valued time domain signal. This is carried out to attenuate the undesired noise signal components that may be present in the target signal. These frequency dependent beamformer coefficient values are sometimes derived from an estimate of the time-frequency dependent ratio of target signal and noise signal.

Voice activation is an area that is receiving more attention today than ever because portable devices such as mobile telephones, smartphones, audio-enabled tablets, audio/video conferencing systems, hands-free systems, television sets, and more, have gained so much signal processing power that voice-activated convenience functions such as hands-free operation can be included in many of these devices. Voice activation and speaker identification systems may rely on the recognition of a target or trigger word, phrase or utterance of an incoming sound signal. Voice activation systems are generally demanding in terms of signal processing resources and accordingly also in terms of power or energy consumption. Devices that have relatively limited power or energy available, such as numerous types of portable battery powered communication devices, typically present a problem for integration of suitable voice-activated control systems and methods.

The perceived quality and intelligibility of the noise-reduced output signals produced by the microphone array processing system are of great importance for the convenience of human users and for the accuracy and success of automatic speech recognition systems, automatic voice-activated system, speaker verification or identification systems etc.

SUMMARY OF THE INVENTION

A first aspect of the invention relates to a microphone array signal processing system, comprising:
 a signal input configured to receive a first digital audio signal from a first microphone of a microphone array and a second digital audio signal from a second microphone of the microphone array,
 a digital buffer coupled to the signal input and configured to store the first digital audio signal and the second digital audio signal,
 a voice trigger input indicating a first signal segment holding a first voice feature of the first digital audio signal in the digital buffer,
 a beamformer analyser configured to, in response to the voice trigger, determine noise statistics, such as an estimated noise covariance matrix $S_{vv}(k)$, based on the first signal segment of the first digital audio signal and a first signal segment of the second digital audio signal, aligned in time to the first signal segment of the first digital audio signal,
 a coefficients calculator configured to calculate a first set of fixed beamformer coefficients of a beamforming algorithm based on the first signal segment of the first digital audio signal, the first signal segment of the second digital audio signal and the determined noise statistics, and
 the beamforming algorithm being configured for applying the first set of fixed beamformer coefficients to at least:
 the first signal segment of the first digital audio signal and the first signal segment of the second digital audio signal retrieved from the digital buffer to produce a noise reduced digital audio signal.

Some embodiments of the present microphone array signal processing system may rely on an externally generated voice trigger input and thereby achieve reduced power consumption compared to embodiments where the voice trigger input is generated by an integral voice detection stage analyzing the first and/or second digital audio signal(s) for presence of the first voice feature. The microphone array signal processing system may in certain embodiments be configured to monitoring and analyzing only a single digital audio signal, e.g. the first or second digital audio signal for presence of the voice or speech feature rather than monitoring and analyzing all digital audio signals, e.g. the first, second and possibly further digital audio signals, produced by respective microphones of the microphone array. In contrast, the beamformer analyser is configured to at least utilize the first and second digital audio signals, generated by the first and second microphones for determination of the noise statistics. The skilled person will understand that some embodiments of the microphone array signal processing system may comprise more than two microphones for example one or more additional microphones to provide improved directivity and increased noise reduction. The increase of component costs and power consumption by adding such one or more additional microphones may be modest.

In some embodiments of the microphone array signal processing system and methodology, the voice detection is performed on both the first and second digital audio signals for example concurrently, or at least partly concurrently. Even though this embodiment may consume more power than the single microphone based voice detection scheme discussed above, this embodiment allows for a detection based on the digital audio signal with the highest level. This is particularly advantageous where the first and second digital audio signals originate from directional first and second microphones oriented in different directions, or are placed some distance apart on a portable communication device or apparatus. If the voice detection is performed simultaneously on this type of directional first and second digital audio signals, the voice trigger input of the microphone array signal processing system is more likely to trigger the subsequent beamformer analyzer correctly. This would be the case for instance if the second microphone and not the first microphone receives the sound or acoustic signal with the highest level.

If a user attempts to control his communication device by voice and gets no response, the experience is dissatisfying. The present invention can provide efficient, but precise voice detection which to a user appears as always on, even though most of an application layer of the microphone processing system resides in a powered down state. This true always-on functionality and subsequent beamformer analysis can for instance be combined with (preferably state-of-the-art) voice recognition algorithms to provide excellent voice-activated responsiveness.

The detection of the first voice feature of the first or second digital audio signals can be performed in numerous ways. Examples include analyzing signal energy and/or determining signal autocorrelation in either time domain or frequency domain of the first digital audio signal. Alternatively, or additionally, entropy-type characterization of the first digital audio signal may be utilized. Voice detection functions, methods and algorithms may operate on an entire signal bandwidth or on sub-bands in a sub-band representation of the first digital audio signal. In some cases, there may be an inverse relationship between detection time and detection precision of the voice feature. The precision of the voice detection may be improved by longer signal samples and more computationally advanced designs of the voice detector algorithm.

In some embodiments, the voice detector may be configured to indicate or flag the first signal segment of the first digital audio signal as including the voice feature when an estimated likelihood of the presence of the voice feature or voice utterance exceeds a predetermined threshold.

The application, via the beamforming algorithm, of the first set of fixed beamformer coefficients to at least the time-aligned first signal segments of the first and second digital audio signals means that the beamformer coefficients remain constant for the duration of the first signal segments. The duration of the each of the first signal segments may correspond to a real-time period comprising an entire word, sentence or speech utterance which comprises the voice feature. The duration of each of the first signal segments may for example represent a time period of the corresponding acoustic signal, i.e. real-time period, picked-up by the first or second microphones exceeding 500 ms, more preferably exceeding 1 second such as exceeding 4 seconds. Keeping the beamformer coefficients fixed or constant for such a prolonged real-time period of the first and second microphone signals is contrary to traditional microphone-array adaptive beamforming algorithms where beamformer coefficients are frequently or continuously updated for example at time steps or signal frames of a few milliseconds. However, the performance of voice recognition applications, seeking to recognize a trigger word, phrase or utterance in the noise reduced digital audio signal, has been shown to increase when the noise reduced digital audio signal have been derived by a fixed or constant beamformer coefficients. This performance improvement of voice recognition applications is caused by the linear and time-invariant property of the present beamformer algorithm which produces a noise reduced digital audio signal with less speech modulation and other signal artefacts than traditional adaptive beamforming algorithms.

The skilled person will understand that the microphone array signal processing system during operation may be configured to continuously record or store the first and second digital audio signals generated by the first and second microphones of the microphone array in a circular digital buffer and repeatedly activate the beamforming algorithm in response to the receipt of further voice trigger inputs indicating the locations of the first signal segments holding respective subsequently received voice features. In this manner, the microphone array signal processing system is capable of repeatedly or continuously detecting the presence of voice features in the incoming digital microphone signals and apply the beamforming algorithm to repeatedly produce noise reduced digital audio signals holding respective voice features.

The beamformer analyser is configured to determine the noise statistics at least based on the first signal segment of the first digital audio signal and the first signal segment of the second digital audio signal where the latter signal segment is aligned in time to the first signal segment of the first digital audio signal. In one embodiment, the beamformer analyzer is configured to determine the noise statistics based on the entire stored portion of the first digital audio signal and the entire stored portion of the second digital audio signal, and optionally the one or more digital audio signals when available.

In some embodiments, the beamformer analyzer operates on sub-band representations of the first and second digital audio signals generated by e.g. a complex filterbank. One such example is the use of a complex discrete Fourier Transform (DFT) filterbank, where a vector $Y(k, n)$ of M coefficients are calculated as $$Y_m(k, n) = \sum_{l=0}^{L-1} y_m(nD + l)w_A(l)e^{-2\pi jkl/L} \quad (1)$$

where m is the microphone number $1 \leq m \leq M$, k designates a subband index, n is the frame (time) index, $w_A(l)$ represents analysis window function, L is a frame length, and D is filterbank decimation factor. This describes the general case with M microphones, e.g. two or more, in the microphone array, generating corresponding digital audio signals $y_m$.

In some embodiments of the invention, the beamformer analyzer is configured to determine the noise statistics based solely on the first signal segments of the first and second digital audio signal as these have been flagged or indicated as comprising the voice or speech feature. Other segments of the first and second digital audio signals such as the second signal segments that precede the start location of the first signal segments may or may not include voice information and may therefore be discarded from subsequent beamforming processing to produce the noise reduced digital signal, including the beamformer analysis. By beamforming solely those segments of the first and second digital audio signals that are flagged by the voice trigger input as including voice features processing resources and power consumption of the microphone array signal processing system are reduced.

In other embodiments of the invention, the beamformer analyzer is configured to include a second signal segment preceding the first signal segment of the first digital audio signal in time in the determination of the noise statistics. This feature allows the beamformer analyzer to determine the noise statistics very accurately because the second signal segment typically holds a substantially "clean" noise component or signal of the first digital audio signal, i.e. without any interfering target speech components or features. According to this embodiment, the beamformer analyser is configured to:

retrieving signal samples of a second signal segment of the first digital audio signal, or a second signal segment of the second digital audio signal, from the digital buffer; said second signal segments preceding the first signal segment of the first digital audio signal in time; and determining the noise statistics based on the first signal segment of the first digital audio signal and the second signal segment of the first or second digital audio signal.

The second signal segment of the first digital audio signal may for example precede the start location of the first signal segment of the first digital audio signal by a predetermined time period such as a time period larger than 100 ms or larger than 200 ms or even larger than 500 ms. The second signal segment of the second digital audio may precede the first signal segment of the second digital audio signal in a corresponding manner. The first and second signal segments of the first digital audio signal of the digital buffer may be adjacent in time such that an end time of the second signal segment of the first or second digital audio signal may precede a start time of the first signal segment of the first or second digital audio signal with a certain intermediate time period. The first and second signal segments of the second digital audio signal may be arranged or located in a corresponding manner in the digital buffer. The time relationships between the respective first and second signal segments of the first digital audio signal and second digital audio signal may be reflected in the order of the signal segments in the digital buffer.

In certain embodiments of the invention, the beamformer analyzer may even by configured to determine the noise statistics exclusively based on the second signal segment or segments of the first and/or second digital audio signals.

Preferably, the first and second digital audio signals have the same sampling rate or frequency, e.g. a sampling frequency between 16 kHz and 96 kHz. The first and second digital audio signals can be indexed in such a way that each signal/audio sample of the first signal segment of the first digital audio signal has a time aligned corresponding signal/audio sample in the first signal segment of the second digital audio signal. In practice, small time delays between respective samples of the first and second digital audio signals may exist due for instance to sampling operations of the individual microphone signals to generate their corresponding digital audio signals. In practice, different sampling rates between microphones, different electronic delays in corresponding microphone circuits, and so on can be corrected for by suitable processing, such as by up- and/or down-sampling of one or both of the first and second digital audio signals, sample interpolation, shifting of one digital audio signal with respect to the other (or others, if three or more microphones are used) and so on.

In some embodiments of the present invention, the voice detection is based on one or more signal frames of the first digital audio signal. Preferably, at least one of the signal frames is shorter than 26 ms, such as shorter than 11 ms.

The digital buffer preferably comprises circular digital buffer. The digital buffer may store or hold signal portions of at least 1 second, preferably at least 2 seconds, 3 seconds, 4 seconds or 5 seconds, of each of the first and second (and further, if applicable) digital audio signals. The digital buffer may use various types of volatile or non-volatile semiconductor memory cells, such as RAM, DRAM, SRAM, register files etc., for storage of the first and second (and further, if applicable) digital audio signals.

In certain embodiments of the microphone array signal processing system, the beamforming algorithm is configured for:

retrieving signal samples of a third signal segment of the first digital audio signal from the digital buffer; said third signal segment located after the first signal segment of the first digital audio signal; and retrieving signal samples of a third signal segment of the second digital audio signal from the digital buffer; said third signal segment located after the first signal segment of the second digital audio signal;

applying the first set of fixed beamformer coefficients to the third signal segments of the first and second digital audio signals.

The processor may hence proceed to apply the beamforming algorithm, still using the first set of fixed beamformer coefficients, to the retrieved signal samples of the the third signal segments until signal samples of the first and second digital audio signals are reached which correspond essentially to real-time audio signals. The latter embodiment allows the output of the beamforming algorithm to produce a real-time noise reduced digital signal as discussed in additional detail below with reference to the appended drawings. The first signal segments may comprise the previously discussed target or trigger word, phrase or utterance and the third signal segments may for example comprise a voice command. Both of the target/trigger word, phrase or utterance and the voice command must be recognized by a cloud-based application to provide voice control services to a particular user pronouncing the trigger word and voice command.

The first and second (and further, if applicable) digital audio signals may comprise a target signal, typically sound originating from a source of interest such as speech originating from a specific speaker mixed with a noise signal. In this context, the noise signal represents all other origins or sources of sound, either other, competing, speakers or various types of stationary or non-stationary background noise. The noise reduced digital audio signal, produced by applying the beamforming algorithm to the first signal segments of the first and second digital audio signals and/or applying the beamforming algorithm to the first and second digital audio signals obtained directly from the first and second microphones, has a higher signal-to-noise ratio than the signal-to-noise ratio of each of the of the first and second digital audio signals. In other words, the target signal is enhanced relative to the noise signal.

Once the beamformer analyser has been triggered by the voice trigger input or voice flag, the beamformer analyser accesses the indicated segments of the first and second digital audio signals stored in the digital buffer. As described previously, this may include the second signal segments of the first and second digital audio signals preceding the start location of the first signal segments with at least 200 ms. During the beamformer analysis phase the first signal segments of the first and second digital audio signals are preferably analysed to obtain noise statistics for providing of beamformer coefficients that suppress the corresponding noise signal of the noise reduced digital audio signal.

The first voice trigger input may be generated by an external, relative to the microphone array signal processing system, third party application program connected to the digital buffer, for example via a wireless communication channel to a cloud-based application. Alternatively, the first voice trigger input may be generated by an integral voice detector of the microphone array signal processing system as discussed in further detail below with reference to the appended drawings.

The beamformer analysis may comprise a plurality of beamformer processing passes for detecting and subsequent enhancing a corresponding plurality of target signals. Each pass may comprise detecting an acoustical signature of a target speaker. Each pass preferably provides beamformer coefficients for suppressing background noise.

In some embodiments, the beamformer analyzer may continue to operate for a certain period of time for example until an early analysis termination signal interrupts further processing or until a predetermined amount of time has elapsed. An early termination signal may be generated by an estimator that has determined that an adequate amount of acoustical information has been gathered in order to compute an optimal first set of fixed beamformer coefficients for noise suppression.

In some embodiments, the beamformer analysis comprises a step of determining a target indicator signal and/or a noise indicator signal indicating or flagging, respectively, a voice feature and/or a noise signal. An analysis may be performed to estimate signal segments of the first and second digital audio signals in the time-frequency domain that are most likely to be (undesired) noise signals and estimate signal segments such as the first signal segments that are likely to contain the target signal. This analysis can be expressed in the time-frequency domain in the form of one or more indicator signals, such as a binary noise signal $F_{N,k}(n)$ and/or a voice presence signal $F_{S,k}(n)$.

In a first embodiment, the voice presence signal is a constant $F_{S,k}(n)=1$ and the noise presence signal is derived by comparing the output of a background noise spectral density estimator, operating on a preselected one of the first and second digital audio signals from the microphones, to an instantaneous noise level. One exemplary background noise spectral density estimator is described in [1]. Letting the background noise estimate be designated as $\tilde{\sigma}_N^2(k,n)$, a noise presence signal may be derived as:

$$F_{N,k}(n) = 1 - u\left(10\log_{10}\frac{|Y_{m_0}(k,n)|^2}{\tilde{\sigma}_N^2(k,n)} - T_N\right) \quad (1)$$

where $u(x)$ can be a unit step function, and $T_N$ is a predetermined threshold, for example 5 dB, 10 dB, 15 dB or 20 dB.

In another embodiment, the binary noise signal is additionally derived on basis of phase characteristics of the first and second digital audio signals.

By using the one or more of these indicator signals, so-called mixture covariance and noise covariance matrices $S_{yy}(k)$ and $S_{vv}(k)$ are formed in each of the sub-bands by averaging the first and second digital audio signals across time frames. The first and second digital audio signals may be averaged from the start points of the previously discussed second signal segments of the first and second digital audio signals. The start point or start time of the second signal segments may for example precede the start point of the first signal segments with about 200-500 ms as discussed above. The start point of the first signal segments may be designated as signal frame $N_0$ and the end point of the analysis phase designated by signal frame $N_1$. In this averaging process, the one or more indicator signals are used as weighting functions.

$$S_{vv}(k) = \frac{1}{\alpha + \sum_{n=N_0}^{N_1} F_{N,k}(n)} \sum_{n=N_0}^{N_1} Y(k,n)Y(k,n)^H F_{N,k}(n) \quad (2)$$

$$S_{yy}(k) = \frac{1}{\alpha + \sum_{n=N_0}^{N_1} F_{S,k}(n)} \sum_{n=N_0}^{N_1} Y(k,n)Y(k,n)^H F_{S,k}(n) \quad (3)$$

Where k refers to a frequency band index, and v refers to a noise signal component while $\alpha$ is a small constant to avoid division by 0.

In some embodiments, a target propagation vector d(k) is estimated in each sub-band from the mixture covariance matrix and noise covariance matrix. In some embodiments, the target propagation vector d(k) is calculated by an eigenvector analysis eigenvector of the matrix $S_{vv}^{-1}(k)S_{yy}(k)$ selecting the eigenvector corresponding to the largest eigenvalue as the propagation vector.

A set of optimal and fixed beamformer coefficients for the beamformer algorithm may be calculated in each sub-band as a vector:

$$w(k) = \frac{S_{vv}^{-1}(k)d(k)d_0(k)^*}{d(k)^H S_{vv}^{-1}(k)d(k)} \quad (4)$$

The beamformer coefficients of each sub-band represent weights of a complex linear combination of the first and second digital audio signals at the corresponding sub-band, which minimizes noise components while maintaining target speech components. The noise reduced sub-band signal may be calculated as:

$$Y_{enh}(k,n) = w(k)^H Y(k,n) \quad (5)$$

The microphone array signal processing system may furthermore comprise a beamformer configured to combine the first and second digital audio signals into the previously discussed noise reduced digital audio signal with a higher signal-to-noise ratio than a signal-to-noise ratio of each of the first and second digital audio signals. The improved signal-to-noise ratio of the noise reduced digital audio signal will allow connected speech recognition applications or voice command applications to more accurately recognize spoken words such as device commands. The improved signal-to-noise ratio of the noise reduced digital audio signal may furthermore lower power consumption and computational resources of the connected speech recognition applications or voice command applications. This is particularly advantageous where the beamformer analyser is configured to operate at least partly on a frame-by-frame basis, where the microphone array signal processing system can be configured to not require further digital buffer resources for storing for system for instance operates on sub-band signals from more than one frame at a time. Although the analysis filter bank may be computed more than once (at least once for the beamformer analysis stage and once for the beamformer application stage, if included), these additional calculations incurred by the analysis filter bank may be a favourable trade-off in return for the reduction in the amount of processing memory required.

The noise reduced digital audio signal $y_{enh}(t)$ is preferably obtained using a synthesis filter bank process according to:

$$y_{enh}(t) = \sum_n \frac{D}{L} \sum_{k=0}^{L-1} Y_{enh}(k,n) w_S(l) e^{2\pi jkl/L} \bigg|_{l=t-nD} \quad (6)$$

where $w_S(l)$ is a synthesis window function, $w_S(l)=0$ for $l<0$ and $l\geq L$.

In some embodiments of the microphone array signal processing system, the beamforming algorithm is applied to operates not only on the stored first signal segments, and optionally the second signal segments, of the first and second digital signals, but additionally on real time samples of the first and second digital audio signals stored in the digital buffer as discussed in further detail below with reference to the appended drawings. The latter embodiment of the present microphone array signal processing system applies the set of computed fixed beamformer coefficients of the beamforming algorithm to the real time digital audio signals to produce the noise reduced digital audio signal $y_{enh}(t)$ in real time and enhancing the target signal in real time. This feature in combination with speech recognition and a translation database can provide for real-time translation of speech. The application of the beamforming algorithm to both the stored first and second digital audio signals and to the subsequent real-time continuation signals thereof received from the microphone array result in the entire portions of the first and second digital audio signals from the on-set of the voice feature up till a current time may be noise reduced.

Subsequently, or in a streaming fashion, the noise reduced digital audio signal can be transmitted to, or passed on to, subsequent analysis for instance by a voice recognition, a voice response, a speaker verification or a translation application or system as discussed in additional detail below with reference to the appended drawings.

Once the first signal segments of the first and second digital audio signals, and optionally further signal segments held in the digital buffer such as the previously discussed second signal segments of the first and second digital audio signals, have been processed, the microphone array signal processing system may proceed to flush or overwrite the first set of fixed beamformer coefficients. The microphone array signal processing system may subsequently compute a second set of fixed beamformer coefficients based on new or updated digital audio signals stored in the digital buffer and apply the second set of fixed beamformer coefficients to the new digital audio signals and so forth as time evolve. In this manner, new sets of fixed beamformer coefficients may be repeatedly calculated and applied to the digital audio signals received from the first and second microphones at regular time intervals or irregular time intervals depending on the arrival of subsequent voice features at the microphone array. Hence, the processor may be configured to repeatedly compute subsequent sets of fixed beamformer coefficients e.g. at time intervals exceeding 1 s or exceeding 2 s or exceeding 5 s.

Accordingly, one embodiment of the microphone array signal processing is configured to:

flushing the first and second digital audio signals in the digital buffer, storing a third and a fourth digital audio signal in the digital buffer, awaiting a second voice trigger input indicating a second signal segment holding a second voice feature of the third digital audio signal in the digital buffer, determine noise statistics, in response to the second voice trigger, by the beamformer analyser to determine noise statistics, such as a noise covariance matrix $S_{vv}(k)$, based on the second signal segment of the third digital audio signal and a second signal segment of the fourth digital audio signal, aligned in time to the second signal segment of the third digital audio signal, flushing the first set of fixed beamformer coefficients, calculating a second set of fixed beamformer coefficients by the coefficients calculator based on the second signal segment of the third digital audio signal, the second signal segment of the fourth digital audio signal and the determined noise statistics, and applying, by the beamforming algorithm, the second set of fixed beamformer coefficients to the second segment of the third digital audio signal and the second segment of the fourth digital audio signal retrieved from the digital buffer to produce a second noise reduced digital audio signal.

The skilled person will understand that respective signal processing functions, blocks or units implemented by the claimed estimators, vectors, statistics processors, sub-band filter banks etc. of the present microphone array signal processing system and the method for processing microphone array signals may be performed by dedicated digital hardware or by executable program instructions executed on a software programmable microprocessor or any combination of these. The signal processing functions or blocks may be performed as one or more computer programs, routines and threads of execution running on a software programmable signal processor or processors. Each of the computer programs, routines and threads of execution may comprise a plurality of executable program instructions. The signal processing functions may be performed by a combination of dedicated digital hardware and computer programs, routines and threads of execution running on the software programmable signal processor or processors. For example each of the above-mentioned estimators, processors, filter and filter banks etc. may comprise a computer program, program routine or thread of execution executable on a suitable microprocessor, in particular a digital signal processor (DSP). The microprocessor and/or the dedicated digital hardware may be integrated on an ASIC or implemented on a FPGA device.

The analysis filter bank which divides the digital audio input signal into sub-band signals may be configured to compute these in various ways for example using a block-based FFT algorithm or Discrete Fourier Transform (DFT). Alternatively, time domain filter banks such as ⅓ octave filter banks or Bark scale filter banks may be used for this task. The number of sub-band signals typically corresponds to the number of frequency bands or channels of the analysis filter bank. The number of channels of the analysis filter bank may vary depending on the application in question and a sampling frequency of the digital audio signal.

A second aspect of the invention relates to a method of processing microphone array signals. The method comprising:

a) storing a first digital audio signal representing a first acoustic signal received by a first microphone of a microphone array in a digital buffer, b) storing a second digital audio signal representing a second acoustic signal received by a second microphone in the digital buffer, where the second acoustic signal is received concurrently with the first acoustic signal, c) generating or receiving a first voice trigger indicating a first signal segment in the digital buffer holding a first voice feature of the first digital audio signal, d) determining, in response to the first voice trigger, noise statistics, such as a noise covariance matrix $S_{vv}(k)$, based on the first signal segment of the first digital audio signal and a first signal segment of the second digital audio signal, aligned in time to the first signal segment of the first digital audio signal, e) calculating a first set of fixed beamformer coefficients of a beamformer algorithm based on the noise statistics, f) retrieving at least the first signal segment of the first digital audio signal and the first signal segment of the second digital audio signal from the digital buffer, g) applying the beamformer algorithm to the first signal segment of the first digital audio signal and the first signal segment of the second digital audio signal to produce a noise reduced digital audio signal.

As discussed above, one embodiment of the present methodology of processing microphone array signals may comprise:

h) flushing the first and second digital audio signals from the digital buffer, i) receiving a third digital audio signal from the first microphone and a fourth digital audio signal from the second microphone of the microphone array, j) storing the third and fourth digital audio signals in the digital buffer, k) receiving a second voice trigger input indicating a second signal segment of the third digital audio signal in the digital buffer holding a second voice feature, l) determining, in response to the second voice trigger input, determine noise statistics based on the second signal segment of the third digital audio signal and a second signal segment of the fourth digital audio signal, aligned in time to the second signal segment of the third digital audio signal, m) flushing the first set of fixed beamformer coefficients, n) calculating a second set of fixed beamformer coefficients by the coefficients calculator based on the second signal segment of the third digital audio signal, the second signal segment of the fourth digital audio signal and the determined noise statistics, and o) retrieving, from the digital buffer, the second segment of the third digital audio signal and the second segment of the fourth digital audio signal, o) applying the second set of calculated and fixed beamformer coefficients to the second segment of the third digital audio signal and the second segment of the fourth digital audio signal to produce a second noise reduced digital audio signal.

According one embodiment of the present methodology for processing microphone array signals, the generation of the first voice trigger input is performed at least in part on the first signal segment of the first digital audio signal retrieved from the digital buffer.

The present methodology for processing microphone array signals may further comprise:

retrieving signal samples of a second signal segment of the first or second digital audio signal from the digital buffer; said second signal segment preceding the first signal segment of the first digital audio signal in time; and determining the noise statistics based on the first signal segment of the first digital audio signal and the second signal segment of the first or second digital audio signal.

The advantages of using the second segment of the first digital audio signal to improve the accuracy of the determined noise statistics have been discussed in detail above and will not be repeated here. As mentioned above, a start location of the second signal segment of the first digital audio signal may precede a start location of the first signal segment of the first digital audio signal by a predetermined time interval such as a time interval larger than 200 ms or 500 ms. The end point in the digital buffer of the second signal segment of the first digital audio signal may for example be located substantially at the start location of the first signal segment of the first digital audio signal if the first and second signal segments are adjacent to each other. This feature is capable of producing very accurate noise statistics of the first digital audio signal as discussed in further detail below with reference to the appended drawings.

The present methodology for processing microphone array signals may comprise a further step of: continuously storing current samples of first digital audio signal and the second digital audio signal in the digital buffer by deleting or overwriting the oldest samples of the first and second digital audio signals in the digital buffer to create a circular digital buffer.

The present methodology for processing microphone array signals may comprise determining a portion of the second signal segment of the first digital audio likely to belong to a noise signal.

In an embodiment of the present method, the beamformer algorithm is exclusively applied to the first signal segments, and optionally further signal segments comprising voice features, of the first and second digital audio signals of the digital buffer to produce the noise reduced digital audio signal.

One embodiment of the present methodology of processing microphone array signals additionally comprises:

identifying an end location of the first signal segment of at least one of the first and second digital audio signals of the digital buffer, retrieving signal samples of a third signal segment, arranged after the end location of the first signal segment, of the first digital audio signal from the digital buffer; and retrieving signal samples of a third signal segment, arranged after the end location of the first signal segment, of the second digital audio signal from the digital buffer;

applying the first set of fixed beamformer coefficients to the third signal segments of the first and second digital audio signals to produce a further noise reduced digital audio signal representative of the third signal segments.

As discussed above, the present methodology for processing microphone array signals comprise a further step of:

transmitting the noise reduced digital audio signal to at least one of: a speech recognition system, a speaker verification system, a voice command system, a computer-implemented translation system, an autotune system.

A third aspect of the invention relates to a portable communication device or apparatus comprising a microphone array signal processing system according to any of the embodiments described above.

BRIEF DESCRIPTION OF THE DRAWINGS

Embodiments of the invention will be described in more detail in connection with the appended drawings in which.

DESCRIPTION OF PREFERRED EMBODIMENTS

Figure 1:
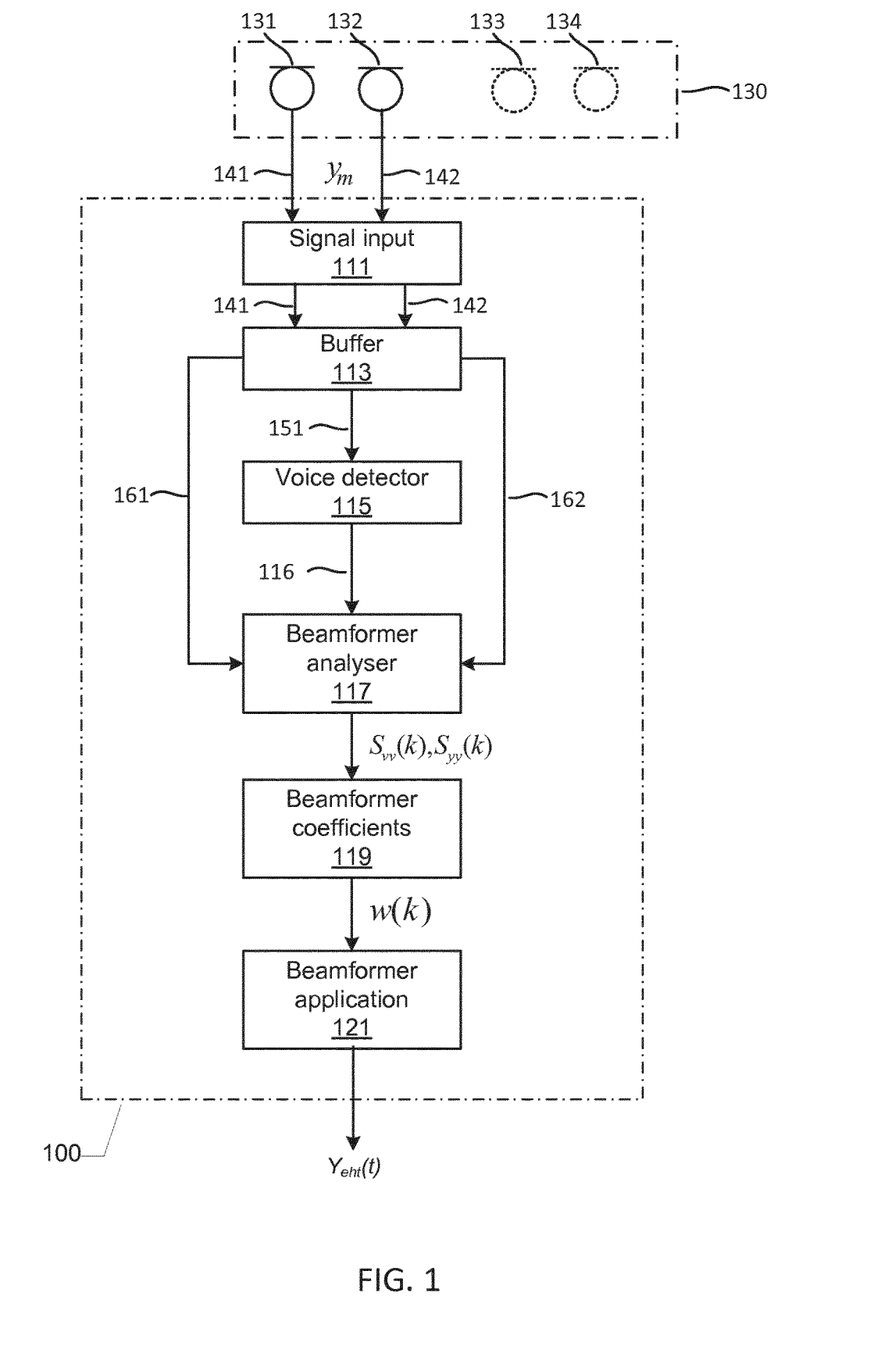
FIG. 1 shows a simplified schematic block diagram of a microphone array signal processing system in accordance with a first embodiment of the present invention.
Figure 3:
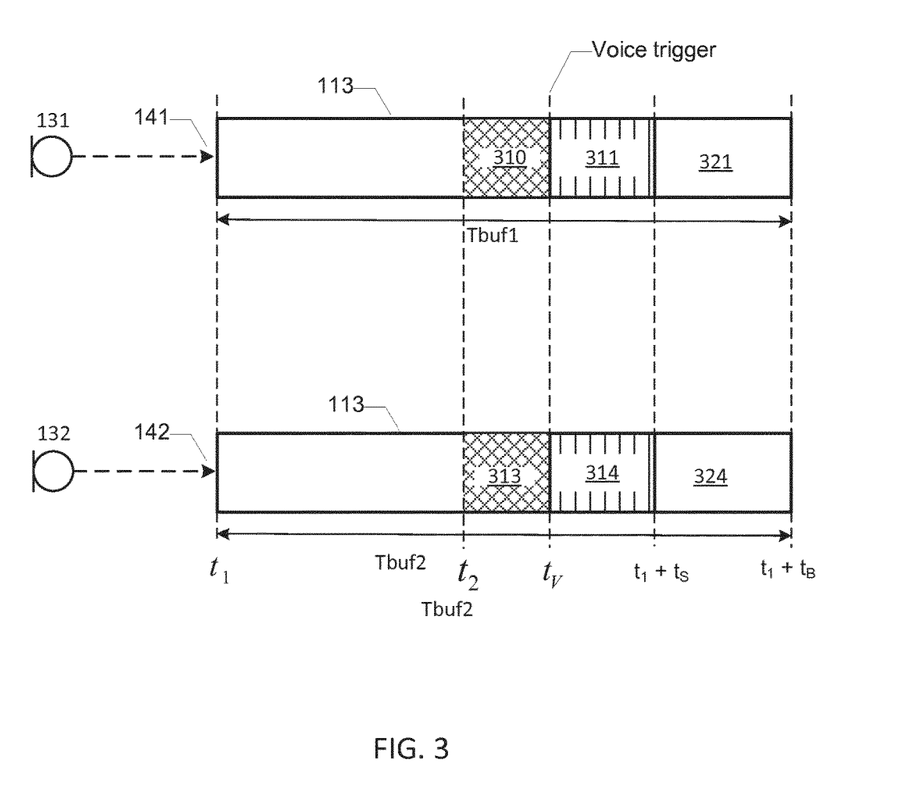
FIG. 3 illustrates an exemplary layout of a digital buffer of the microphone array signal processing system storing several signal segments of the first and second digital audio signals.

FIG. 1 illustrates an embodiment of a microphone array signal processing system 100 in accordance with an exemplary embodiment of the present invention. A first microphone and a second microphone 131,132, respectively, may be included in a microphone array 130 and arranged pick up acoustic signals such as audible sound from the surroundings. The skilled person will appreciate that the microphone array 130 may comprise one or more additional microphones 133, 134 etc. for pick-up and storage of further acoustic and corresponding digital audio signals. The first and second microphones 131,132, respectively, produce corresponding first and second digital audio signals 141,142 applied to a signal input 111 of the microphone array signal processing system 100. The digital audio signals are stored in a circular digital buffer 113 having a storage capacity corresponding to about 1-10 seconds of real-time signal of each of the first and second digital audio signals 141,142. This means that acoustic signals that are pick-up by each of the first and second microphones 131,132 within a preceding 1-10 seconds (not counting delays related to electronic processing between the microphone transducers and the storing in the buffer) are held in the circular digital buffer 113 and available for analysis and processing. This feature is schematically illustrated on FIG. 3 showing an exemplary layout of the circular digital buffer 113 showing the time period Tbuf1 of the first digital audio signal 141 in the circular digital buffer 113 and a corresponding time period Tbuf2 of the second digital audio signal 142 in the circular digital buffer 113.

The first and second digital audio signals 141,142 are not necessarily processed in the beamformer analyser 117 during operation of the microphone array signal processing system 100. Continuous operation of the beamformer analysis 117 would consume unnecessary processing power during time periods without any voice feature or speech feature, i.e. a target or desired signal, present in the first digital audio signal stored in the circular digital buffer 113. Instead, the voice detector 115 monitors the first and/or second digital audio signals 141, 142 held in the circular digital buffer 113 by retrieving certain signal segments or frames of the first digital audio signal 141 and performing initial voice detection based on that frame or segment. In this way, voice activity can be detected using as little power as possible because the voice detector 115 needs only have voice detection capabilities. The voice detector 115 is configured to generate a voice trigger input 116 in response to the detection of a voice feature in the first digital audio signal 141 and supply this voice trigger input 116 to the beamformer analyser 117. The voice trigger input 116 may include an indicator of a location of a first signal segment (e.g. 311 of FIG. 3) of the first digital audio signal 141 held in the circular digital buffer 113 holding the detected voice feature.

Figure 2:
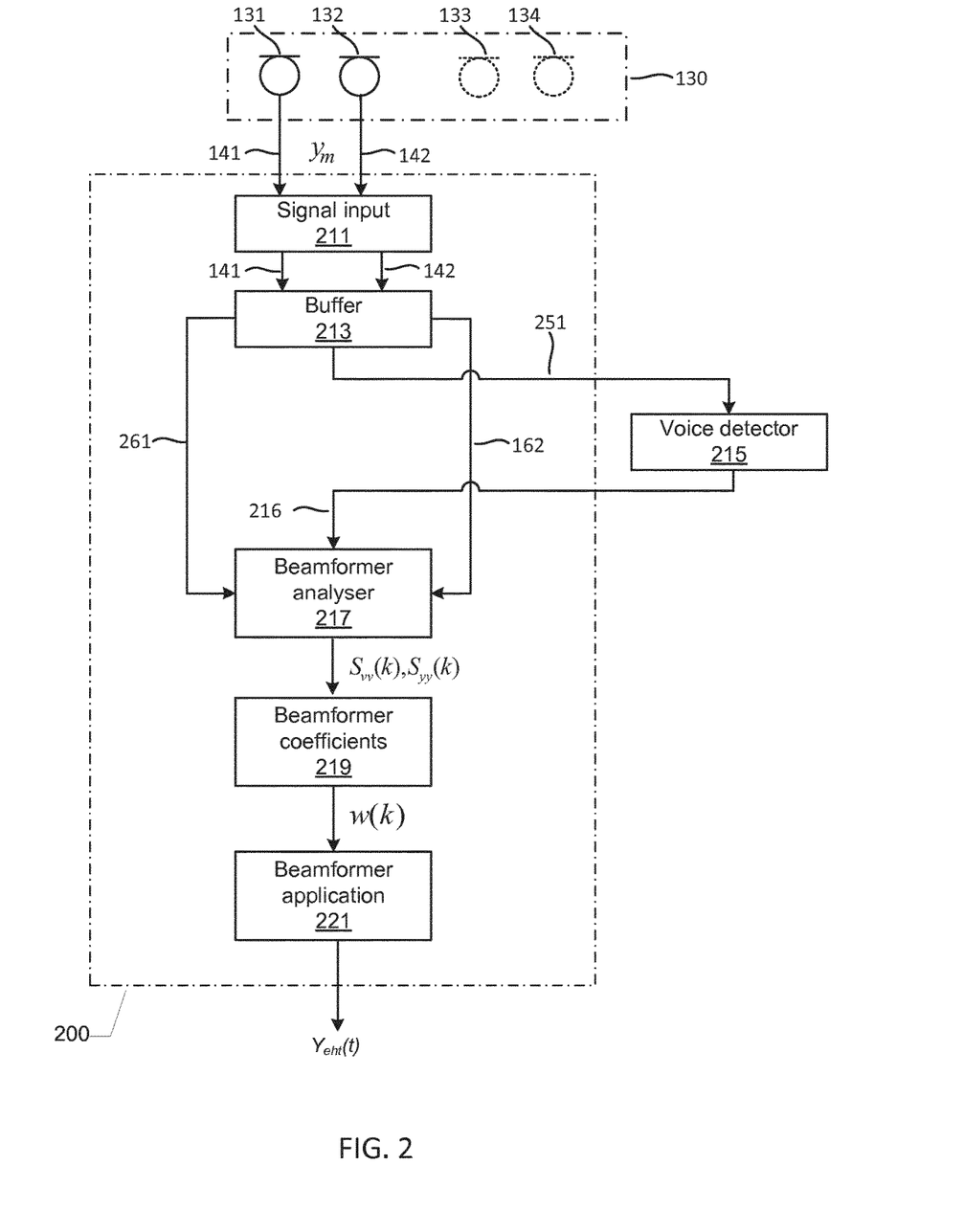
FIG. 2 shows a simplified schematic block diagram of a microphone array signal processing system in accordance with a second embodiment of the present invention.

The skilled person will appreciate that alternative embodiments of the microphone array signal processing system 100 may lack the voice detector 115 as schematically illustrated on the alternative embodiment of the microphone array signal processing system 200 depicted on FIG. 2. In the latter embodiment, an external third party application program 215 accesses and analyses the content of the circular digital buffer 113 to recognize or identify the desired voice features. The third party application program 215 may generate the voice trigger input 216 or voice flag upon detection of the voice feature of the first digital audio signal 141 and return or transmit this voice trigger input to a suitable function or block of the microphone array signal processing system 200 such as the beamformer analyser 217. The voice trigger input 216 may include an indicator of a location of the first signal segment 311 holding the voice feature of the first digital audio signal 141 stored in the circular digital buffer 113. This feature is schematically illustrated on FIG. 3 showing an exemplary layout of the circular digital buffer 113. The voice trigger input indicates a start location or time instant $t_v$ in the circular digital buffer 113 of the first signal segment 311. The start location may of course correspond to a particular address of the circular digital buffer 113. The exemplary layout of the circular digital buffer 113 on FIG. 3 also shows a first signal segment 212 of the second digital audio signal 142 held in the circular digital buffer 113 holding a voice feature. The voice trigger input 116 may likewise indicate a start location or time instant $t_v$ in the circular digital buffer 113 of the first signal segment 314 of the second digital audio signal 142.

In response to the voice trigger input 116, the beamformer analyser 117 is switched from a deactivated state to an activated state. The beamformer analyser 117 typically requires markedly more computational power than the voice detector 115. Had the beamformer analyser 117 been active continuously, unnecessary power and processing resources would be wasted. Instead, the beamformer analyser 117 is preferably activated only in response to the voice detector 115 indicates or flags the presence of a voice feature in the first digital audio signal 141.

The beamformer analyser 117 operates by representing each of the first and/or second digital audio signals 141, 142 using respective sub-bands for example a DFT filter bank, where a vector Y(k, n) of 2 coefficients (corresponding to each of the first and second digital microphone signals) are calculated as $$Y_m(k,n) = \sum_{l=0}^{L-1} y_m(nD+l)w_A(l)e^{-2\pi jkl/L} \tag{7}$$

The beamformer analysis of the present embodiment also determines a noise signal $F_{N,k}(n)$, a voice presence signal $F_{S,k}(n)$ and mixture and noise covariance matrices $S_{yy}(k)$ and $S_{vv}(k)$, respectively, in each of the sub-bands by averaging signals across time frames over at least the first signal segment 311 of the first digital audio signal 141 and the first signal segment 314 of the second digital audio signal 142 held the circular digital buffer 113. The beamformer analysis may additionally use a second signal segment 310 of the first digital audio signal 141 and the second segment 313 of the second digital audio signal 142 held in the circular digital buffer 113. The second signal segments 310, 313 may be located at time point $t_2$ preceding the previously discussed start location $t_v$ of the first signal segments 311, 314 as indicated by the voice trigger input 116, by a predetermined time period such as 200 ms. The time point $t_1$ may represent the oldest portions of the first and second digital audio signals 141, 142 stored in the circular digital buffer 113. The start point of the second signal segment 310 may be designated as frame $N_0$ until the aforementioned end of the analysis phase $N_1$ where the latter frame may be located at the end point of the second signal segment 310. In this averaging process, the noise signal and the voice presence signal are used as weighting functions:

$$S_{vv}(k) = \frac{1}{\alpha + \sum_{n=N_0}^{N_1} F_{N,k}(n)} \sum_{n=N_0}^{N_1} Y(k,n)Y(k,n)^H F_{N,k}(n) \quad (8)$$

$$S_{yy}(k) = \frac{1}{\alpha + \sum_{n=N_0}^{N_1} F_{S,k}(n)} \sum_{n=N_0}^{N_1} Y(k,n)Y(k,n)^H F_{S,k}(n) \quad (9)$$

where k refers to a frequency band index, and v refers to a noise signal component while $\alpha$ is a small constant to avoid division by 0.

A target propagation vector d(k) is estimated in each sub-band from the mixture and noise covariance matrices $S_{yy}(k)$ and $S_{vv}(k)$, respectively. The propagation vector is calculated by an eigenvector analysis of the matrix $S_{vv}^{-1}(k) S_{yy}(k)$. Let the eigenvector corresponding to the largest eigenvalue be denoted as e(k), then the propagation vector is calculated as $d(k)=S_{vv}(k)e(k)$.

A set of optimal beamformer coefficients for each sub-band is then calculated in step 119 as a vector:

$$w(k) = \frac{S_{vv}^{-1}(k)d(k)d_0(k)^*}{d(k)^H S_{vv}^{-1}(k)d(k)} \quad (10)$$

The beamformer coefficients for each sub-band represent weights of a complex linear combination of the first and second digital audio signals 141,142 at the corresponding sub-band, which linear combination minimizes noise components while maintaining the desired voice or speech features or components. The enhanced, or noise-reduced, output signal of each of the sub-bands may be determined according to:

$$Y_{enh}(k,n) = w(k)^H Y(k,n) \quad (11)$$

A noise reduced digital output signal $y_{enh}(t)$ of the microphone array signal processing systems 100, 200 may be computed or constructed in step 121 using a synthesis filter bank process:

$$y_{enh}(t) = \sum_n \frac{D}{L} \sum_{k=0}^{L-1} Y_{enh}(k,n)w_S(l)e^{2\pi jkl/L} \bigg|_{l=t-nD} \quad (12)$$

where $w_S(l)$ is a synthesis window function, $w_S(l)=0$ for l<0 and l≥L.

The noise reduced digital output signal $y_{enh}(t)$ may be subjected to further exploitation and processing in accordance with requirements of a particular application such as voice recognition, speaker identification or other voice/speech-related processing.

Figure 4:
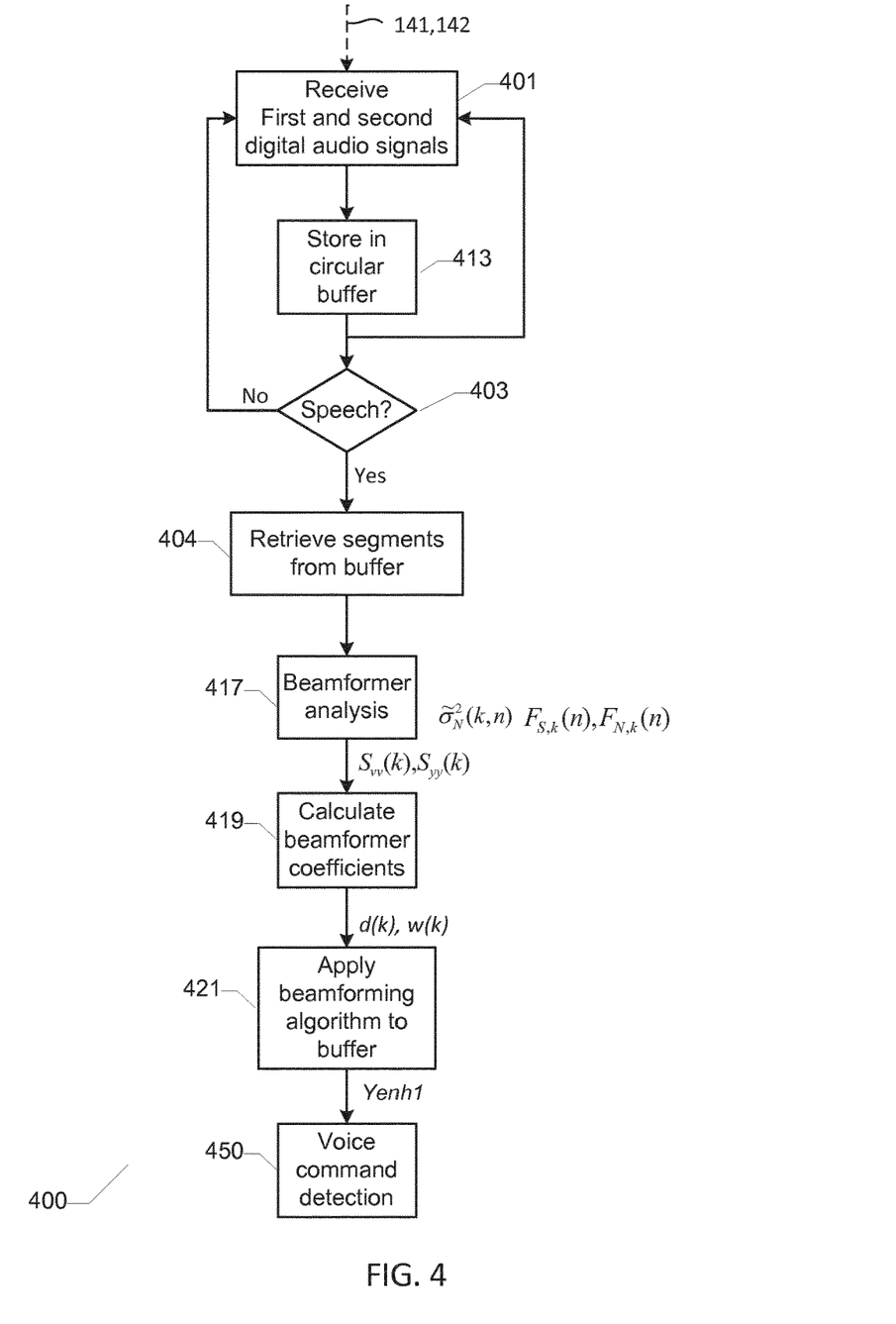
FIG. 4 is a flowchart of processing steps of a method of processing microphone array signals in accordance with another aspect of the present invention.

FIG. 4 shows a flowchart 400 of processing steps performed by the processor of the microphone array signal processing system 100 to implement different embodiments of the present methodology of processing microphone array signals in accordance with another aspect of the present invention. The first and second digital audio signals 141,142 are applied at the signal input in step 401 and stored in the circular digital buffer at step 413. While the first and second digital audio signals 141,142 are continuously applied at the signal input, the voice detector monitors and analyses in step 403 the first digital audio signal stored in the circular digital buffer for presence of voice or speech features. Note that the voice detector operates on the first digital audio signal stored in the circular digital buffer, not on the microphone signals as they are received at the signal input. Optionally, the voice detector may monitor and analyse the first digital audio signal 141 taken directly from the signal input rather than from the stored replica in the digital circular buffer. Thus, in the latter embodiment the voice detector retrieves audio signal samples from the circular buffer, as illustrated in the flowchart 400. If the portion of the first digital audio signal held in the digital circular buffer lacks voice or speech features, the processor reverts to repeat steps 401 and 413 receiving and storing respective incoming samples of the first and second digital audio signals 141,142 in the circular digital buffer by deleting the oldest samples of the first and second digital audio signals and adding current samples of the same signals to the appropriate locations or addresses of the circular digital buffer. When the voice detector identifies a voice or speech feature in the first digital audio signal 141 stored in the circular digital buffer, the beamformer analysis is triggered, in step 404, by the previously discussed voice trigger input. The beamformer analysis also comprises retrieval, in step 404, of the previously discussed first signal segments 311, 314 of the first and second digital audio signals 141,142 stored in the circular buffer. This retrieval of the signal segments of the first and second digital audio signals 141,142 from the circular buffer is attractive because it enables the present microphone array signal processing system to provide always-on functionality.

The beamformer analysis 417 determines noise statistics characterising at least the first signal segments 311, 314 of the first and second digital audio signals 141,142 as discussed before. Exemplary computations of suitable noise statistics have been discussed above and will not be repeated here. This also applies to the subsequent calculation of the previously discussed first set of fixed beamformer coefficients in step 419 which is based on the noise statistics provided by the analysis step 417. After the first set of beamformer coefficients have been calculated, the first and second digital audio signals 141,142 can be enhanced in various ways, in particular by the formation of a beamformed and noise reduced digital audio signal where noise components of each of the first and second digital audio signals 141,142 are suppressed or attenuated.

As illustrated by step 421, the first set of fixed beamformer coefficients may via a suitable beamformer algorithm or function be applied to the previously discussed segments of the first and second digital audio signals 141,142 which are stored in the circular digital buffer to produce a corresponding noise reduced digital audio signal $Y_{enh1}$. This feature allows the beamformer algorithm to reduce noise of the selected segments of the first and second digital audio signals stored in the circular digital buffer, i.e. on portions of the first and second microphone signals which are up to 1-10 seconds old. The beamforming algorithm may for example be configured to applying the computed first set of fixed beamformer coefficients to the first signal segment (311 of FIG. 3) holding the voice feature of the first digital audio signal 141 and the first signal segment (314 of FIG. 3) holding the voice feature of the second digital audio signal 142 to produce the first noise reduced digital signal $Y_{enh1}$ holding the voice feature. The skilled person will understand that the improved signal-to-noise ratio of the first noise reduced digital signal $Y_{enh1}$ compared to the signal-to-noise ratios of the first and second digital audio signals 141,142 generally leads to an improved recognition rate of the voice command, algorithm or application 450. Additionally, the beamforming algorithm may be configured to applying the first set of fixed beamformer coefficients to the youngest or most recent samples of the first and second digital audio signals 141, 142 held in the circular digital buffer. These samples are located at time point $t_1+t_B$ in the circular digital buffer 113 schematically illustrated on FIG. 3 and are essentially real-time representations of the first and second digital audio signals supplied by the first and second microphones. The most recent samples of the first and second digital audio signals in the circular digital buffer are utilized to produce a noise reduced digital audio signal $Y_{enh2}$ in real-time. The skilled person will appreciate that the processor of the microphone array signal processing system 100 may be able to compute audio signal samples of the noise reduced digital audio signal $Y_{enh1}$ much faster than real-time. In this manner, the processor may start to apply the beamforming algorithm to the first signal segments 311, 314 of the first and second digital audio signals 141,142 holding the identified/recognized voice/speech feature such the target or trigger word, phrase, utterance, or sentence and subsequently proceed to further apply the beamforming algorithm to third signal segments 321, 324 of the first and second digital audio signals, respectively, arranged later in time, or after the first signal segments 311, 314 of the first and second digital audio signals held in the circular buffer. Consequently, the third signal segments 321, 324 store the youngest, i.e. most recent, signal samples of the first and second digital audio signals 141,142.

The processor may be configured to determine appropriate starts points of the third signal segments 321, 324 based on the voice trigger input which may indicate the location of the start points at $t_v$ as discussed previously, and possibly locations of the end points $t_1+t_s$, of the first signal segments 311, 314 in the digital buffer. The processor may accordingly start retrieving signal samples of the third signal segments 321, 324 of the first and second digital audio signal from the digital buffer and applying the first set of fixed beamformer coefficients to the third signal segments 321, 324 to produce a noise reduced digital audio signal by the beamforming algorithm.

The processor may hence proceed to apply the beamforming algorithm, still using the first set of fixed beamformer coefficients, to the retrieved signal samples of the the third signal segments 321, 324 until the most recent signal samples, located at the time point $t_1+t_B$ representing essentially real-time digital audio signals, are reached so as to produce a real-time noise reduced digital signal $Y_{enh1}$. The processor may in some embodiments be configured to continue to apply the beamforming algorithm, continuing using the first set of fixed beamformer coefficients, to the youngest signal samples of the first and second digital audio signals 141,142 stored in the circular digital buffer 113 for a certain amount of time to produce the real-time noise reduced digital signal $Y_{enh1}$. The noise reduced digital signal $Y_{enh1}$ has numerous useful applications due to the previously discussed absence of modulation artefacts, improvement of perceived sound quality and/or speech intelligibility for a listener. The absence, or at least reduction, of modulation artefacts of the detected voice feature, e.g. the previously discussed trigger word, phrase or utterance, will improve the subjective quality of the voice feature and improve performance of the previously discussed subsequent application such as automatic and continuous speaker verification or recognition, voice command system etc.

Figure 5:
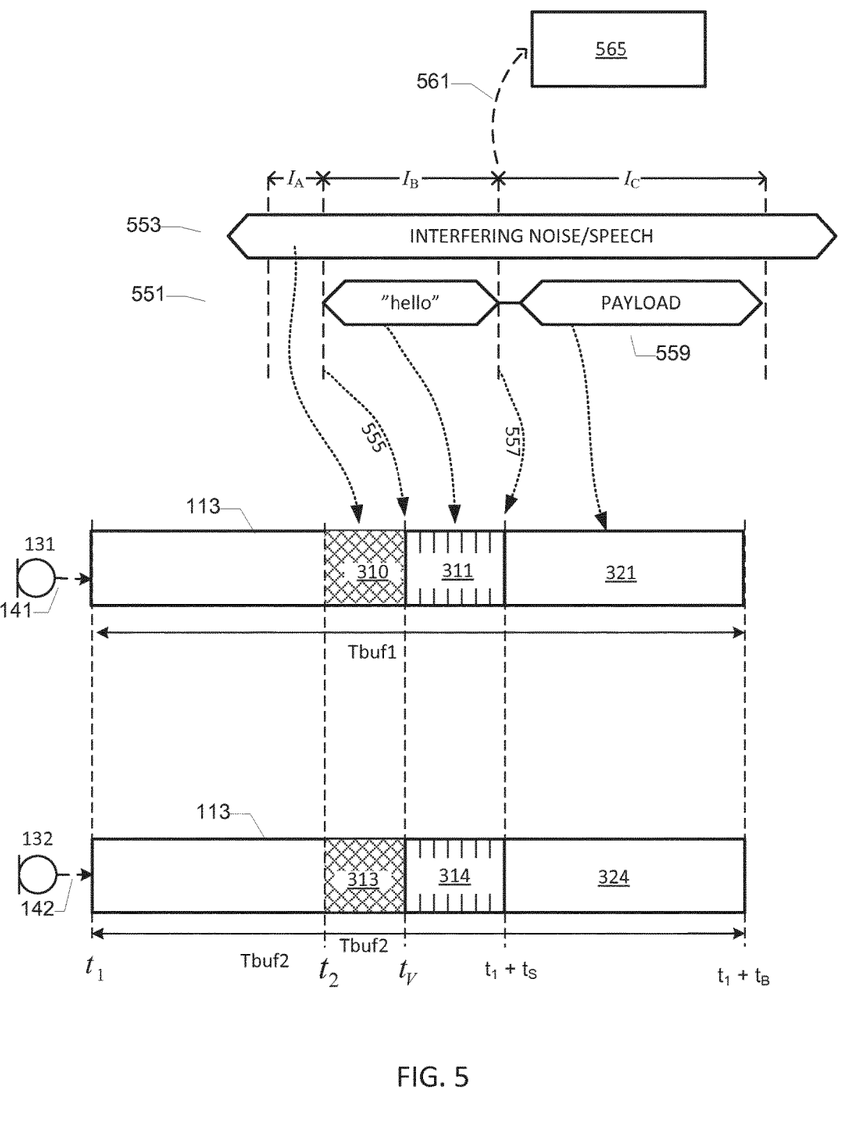
FIG. 5 illustrates processing and recognition steps of an exemplary trigger phrase followed by a voice command stored in respective signal segments of the first and second digital audio signals in the digital buffer.

FIG. 5 illustrates the order of the signal processing and recognition steps associated with receipt of an exemplary trigger phrase followed by a voice command of the first and third signal segments, respectively, of the first and second digital audio signals stored in the digital buffer 113. The skilled person will understand that the present embodiment of the microphone array signal processing system operates as a front-end of a distributed voice command or voice response system. The lower time sequence 551 illustrates a user of the portable communication apparatus pronouncing the trigger phrase "hello" followed by a voice command "PAYLOAD" e.g. representing "switch TV channel". The trigger phrase "hello" is stored in the first segments 311, 314 of the digital buffer 113. In response, the internal or external voice detector recognizes the presence of a voice feature in the first signal segment e.g. 311 of the first digital audio signal and may seek to make a preliminary estimation of whether or not this voice feature contains the trigger phrase "hello". If the trigger phrase estimate is affirmative, the voice trigger input is supplied to the beamformer analyser. The voice trigger input may include a start indicator 555 of a start location, or start time instant, $t_v$ and an end indicator 557 of an end location, or end time instant, $t_1+t_s$ of the first signal segment 311. If the trigger phrase estimate on the other hand is negative, the processor may discard further processing of the first signal segment 311 and awaiting receipt of a subsequent signal segment containing another voice feature.

In response to the affirmative trigger phrase estimate, the beamformer analyser proceeds as discussed above by retrieving signal samples of the second signal segment 310 of the first digital audio signal 141 and the second signal segment 313 of the second digital audio signal 142 held in the circular digital buffer 113. The second signal segments 310, 313 are preferably free from voice signal components of the speaker or user, but may of course include various types of interfering noise and speech as schematically indicated by the upper time sequence 553 showing how interfering noise is captured by the microphone array 131, 132 for the duration of the trigger phrase and voice command. The start indicator 555 of the first voice feature enables the beamforming algorithm to identify the user voice free second signal segments 310, 313. The second signal segments 310, 313 are in combination with the first signal segments, 311, 314 exploited by the beamformer analyser to make a superior noise estimate of the first and second digital audio signals. The coefficients calculator thereafter determines or computes the first set of fixed beamformer coefficients of the beamforming algorithm based on the first signal segments 311, 314 and the determined noise statistics. The beamforming algorithm thereafter applies the first set of fixed beamformer coefficients to the trigger phrase "hello" stored between the start and end locations 555, 557 of the first and second signal segments 311, 314 of the first and second digital audio signals. The application of the beamforming algorithm to the trigger phrase "hello" produces a noise-reduced trigger phrase with improved speech intelligibility and without modulation artefacts for the reasons discussed in detail above. The internal or external voice detector analyses the noise-reduced trigger phrase "hello" and exploits the reduction of noise, and absence of signal artefacts, to provide improved recognition accuracy.

If the previous (positive) recognition result is confirmed, the processor responds by retrieving the signal samples of the third signal segments 321, 324 of the first and second digital audio signal from the digital buffer wherein these third signal segments 321, 324 are located after the first signal segments 311, 314. The third signal segments 321, 324 store the voice command "PAYLOAD" as discussed before. The beamforming algorithm proceeds to apply the previously computed first set of fixed beamformer coefficients to the voice command "PAYLOAD" and produces a corresponding noise-reduced voice command with improved accuracy and speech intelligibility and without introducing modulation artefacts for the reasons discussed in detail above.

The voice command "PAYLOAD" may for example be transmitted to a remotely located automatic (i.e. machine based) speech recognition system 565, speaker verification system or voice command/voice response system through a wireless or wired data communication channel or link 561. The skilled person will understand that the remotely located automatic speech recognition system 565 etc. may comprise a cloud-based system. The remotely located speech recognition system 565 benefits from the improved quality of the noise-reduced command "PAYLOAD" and identifies the appropriate voice command for example from a command table, library or rule based command recognition algorithm. Once the remotely located speech recognition system 565 recognizes the received voice command the system 565 may respond accordingly. The response may be transmitted back to the voice communication apparatus which includes the present microphone array signal processing system via the wireless or wired data communication channel or link 561. Alternatively, the response may be conveyed to other devices such as a TV set, radio or home automation system associated with the user or owner of the voice communication apparatus.

Furthermore, part of the automated voice recognition may be carried out on an application processor of the portable communication apparatus or device itself while other parts of the automated recognition task may be carried out on internet servers e.g. cloud based recognition such as the remotely located speech recognition system 565 discussed above. Sometimes, in order to reduce the amount of time the noise-reduced digital audio signals are transmitted from the portable communication device to servers on the internet, the initial speech recognition stages may be performed on the portable communication device itself, and the recognition of the actual payload sentence is carried out in the cloud-based server system once the initial recognition deems this is required for the successful completion of the voice control command. Cloud based recognition typically results in higher accuracy, although there are certain cost to this. Firstly, this introduces a dependency on an active internet connection in the device, and secondly, a cost in power consumption for waking up the parts of the device required to perform a cloud based query, such as baseband radios and communication stacks. The above-described embodiments of the microphone array signal processing system do not require or assume that a cloud based speech recognition system is connected and active. The present microphone array signal processing system exhibit the previously discussed beneficial properties in both cases, because both cloud-based and non-cloud based speech recognition embodiments of the system benefit from the improved accuracy of the noise-reduced digital audio signal produced by the microphone array signal processing system.

REFERENCE

[1] R. Martin, "Noise power spectral density estimation based on optimal smoothing and minimum statistics," IEEE Trans. Speech Audio Processing, vol. 9, no. 5, pp. 504-512, July 2001.

The invention claimed is:

1. A microphone array signal processing system, comprising:
  a signal input configured to receive a first digital audio signal from a first microphone of a microphone array and a second digital audio signal from a second microphone of the microphone array,
  a digital buffer coupled to the signal input and configured to store the first digital audio signal and the second digital audio signal,
  a voice trigger input indicating a first signal segment holding a first voice feature of the first digital audio signal in the digital buffer,
  a beamformer analyser configured to, in response to the voice trigger input, determine noise statistics, based on the first signal segment of the first digital audio signal and a first signal segment of the second digital audio signal aligned in time to the first signal segment of the first digital audio signal,
  a coefficients calculator configured to calculate a first set of fixed beamformer coefficients of a beamforming algorithm based on the first signal segment of the first digital audio signal, the first signal segment of the second digital audio signal and the determined noise statistics, and
  the beamforming algorithm being configured for applying the first set of fixed beamformer coefficients to at least:
  the first signal segment of the first digital audio signal and the first signal segment of the second digital audio signal retrieved from the digital buffer to produce a noise reduced digital audio signal.

2. A microphone array signal processing system in accordance with claim 1, configured to:
  flush the first and second digital audio signals in the digital buffer,
  store a third and a fourth digital audio signal in the digital buffer,
  await a second voice trigger input indicating a second signal segment holding a second voice feature of the third digital audio signal in the digital buffer,
  determine noise statistics, in response to the second voice trigger input, by the beamformer analyser to determine noise statistics, based on the second signal segment of the third digital audio signal and a second signal segment of the fourth digital audio signal, aligned in time to the second signal segment of the third digital audio signal, flush the first set of fixed beamformer coefficients, calculate a second set of fixed beamformer coefficients by the coefficients calculator based on the second signal segment of the third digital audio signal, the second signal segment of the fourth digital audio signal and the determined noise statistics, and apply, by the beamforming algorithm, the second set of fixed beamformer coefficients to the second signal segment of the third digital audio signal and the second signal segment of the fourth digital audio signal retrieved from the digital buffer to produce a second noise reduced digital audio signal.

3. A microphone array signal processing system according to claim 1, comprising a voice detector configured to analyze at least the first digital audio signal held in the digital buffer and indicate a location of the first signal segment holding the first voice feature.

4. A microphone array signal processing system according to claim 1, wherein the beamformer analyser is further configured to:

retrieve signal samples of a second signal segment of the first digital audio signal, or a second signal segment of the second digital audio signal, from the digital buffer; said second signal segments preceding the first signal segment of the first digital audio signal in time; and determine the noise statistics based on the first signal segment of the first digital audio signal and the second signal segment of the first or second digital audio signal.

5. A method for processing microphone array signals according to claim 4, wherein a start location of the second signal segment of the first digital audio signal precedes a start of the first signal segment of the first digital audio signal by a predetermined time period such as a time period larger than 200 ms.

6. A method for processing microphone array signals according to claim 5, wherein an end point of the second signal segment of the first digital audio signal in the digital buffer lies ahead of the start location of the first signal segment of the first digital audio signal.

7. A method for processing microphone array signals according to claim 6, wherein the end point of the second signal segment of the first digital audio signal in the digital buffer is located substantially at the start location of the first signal segment of the first digital audio signal.

8. A microphone array signal processing system according to claim 1, wherein the beamforming algorithm is configured to:

retrieve signal samples of a third signal segment of the first digital audio signal from the digital buffer; said third signal segment located after the first signal segment of the first digital audio signal; and retrieve signal samples of a third signal segment of the second digital audio signal from the digital buffer; said third signal segment located after the first signal segment of the second digital audio signal; and apply the first set of fixed beamformer coefficients to the third signal segments of the first and second digital audio signals.

9. A microphone array signal processing system in accordance with claim 1, wherein the digital buffer comprises first and second circular buffers configured for continuously storing respective samples of the first and second digital audio signals representing a duration of at least 1 second, of each of the first and second digital audio signals.

10. A microphone array signal processing system in accordance with claim 1, wherein the microphone array comprises one or more additional microphones connected to the signal input.

11. A method of processing microphone array signals comprising steps of:

a) storing a first digital audio signal representing a first acoustic signal received by a first microphone of a microphone array in a digital buffer, b) storing a second digital audio signal representing a second acoustic signal received by a second microphone in the digital buffer, where the second acoustic signal is received concurrently with the first acoustic signal, c) generating or receiving a voice trigger input indicating a first signal segment in the digital buffer holding a first voice feature of the first digital audio signal, d) determining, in response to the voice trigger input, noise statistics, based on the first signal segment of the first digital audio signal and a first signal segment of the second digital audio signal, aligned in time to the first signal segment of the first digital audio signal, e) calculating a first set of fixed beamformer coefficients of a beamformer algorithm based on the noise statistics, f) retrieving at least the first signal segment of the first digital audio signal and the first signal segment of the second digital audio signal from the digital buffer, and g) applying the beamformer algorithm to the first signal segment of the first digital audio signal and the first signal segment of the second digital audio signal to produce a noise reduced digital audio signal.

12. A method for processing microphone array signals in accordance with claim 11, comprising further steps of:

h) flushing the first and second digital audio signals from the digital buffer, i) receiving a third digital audio signal from the first microphone and a fourth digital audio signal from the second microphone of the microphone array, j) storing the third and fourth digital audio signals in the digital buffer, k) receiving a second voice trigger input indicating a second signal segment of the third digital audio signal in the digital buffer holding a voice feature, l) determining, in response to the second voice trigger input, determine noise statistics based on the second signal segment of the third digital audio signal and a second signal segment of the fourth digital audio signal, aligned in time to the second signal segment of the third digital audio signal, m) flushing the first set of fixed beamformer coefficients, n) calculating a second set of fixed beamformer coefficients by the coefficients calculator based on the second signal segment of the third digital audio signal, the second signal segment of the fourth digital audio signal and the determined noise statistics, o) retrieving, from the digital buffer, the second signal segment of the third digital audio signal and the second signal segment of the fourth digital audio signal, and o) applying the second set of fixed beamformer coefficients to the second signal segment of the third digital audio signal and the second signal segment of the fourth digital audio signal to produce a second noise reduced digital audio signal.

13. A method for processing microphone array signals according to claim 11, further comprising:

retrieving signal samples of a second signal segment of the first or second digital audio signal from the digital buffer; said second signal segment preceding the first signal segment of the first digital audio signal in time; and determining the noise statistics based on the first signal segment of the first digital audio signal and the second signal segment of the first or second digital audio signal.

14. A method for processing microphone array signals according to claim 11, wherein the first signal segment of the first digital audio signal represents a time period of a corresponding acoustic signal exceeding 500 ms.

15. A method for processing microphone array signals in accordance with claim 12, further comprising:

continuously storing current samples of first digital audio signal and current samples of the second digital audio signal in the digital buffer by flushing or overwriting the oldest samples of the first and second digital audio signals to create first and second circular digital buffers.

16. A method for processing microphone array signals according to claim 12, further comprising:

identifying an end location of the first signal segment of at least one of the first and second digital audio signals of the digital buffer;

retrieving signal samples of a third signal segment, arranged after the end location of the first signal segment, of the first digital audio signal from the digital buffer;

retrieving signal samples of a third signal segment, arranged after the end location of the first signal segment, of the second digital audio signal from the digital buffer; and applying the first set of fixed beamformer coefficients to the third signal segments of the first and second digital audio signals to produce a further noise reduced digital audio signal representative of the third signal segments.

17. A method for processing microphone array signals in accordance with claim 12, wherein the beamforming algorithm is exclusively applied to the first and second signal segments, and optionally further signal segments comprising voice features, of the first and second digital audio signals of the digital buffer to produce the noise reduced digital audio signal.

18. A method for processing microphone array signals according to claim 11, wherein the first signal segment of the first digital audio signal represents a time period of a corresponding acoustic signal exceeding 1 second.

19. A method for processing microphone array signals according to claim 11, wherein the first signal segment of the first digital audio signal represents a time period of a corresponding acoustic signal exceeding 4 seconds.

* * * * *